Aug. 18, 1931.  H. L. LUELLOFF  1,819,034
FISHING APPARATUS
Filed April 1, 1929
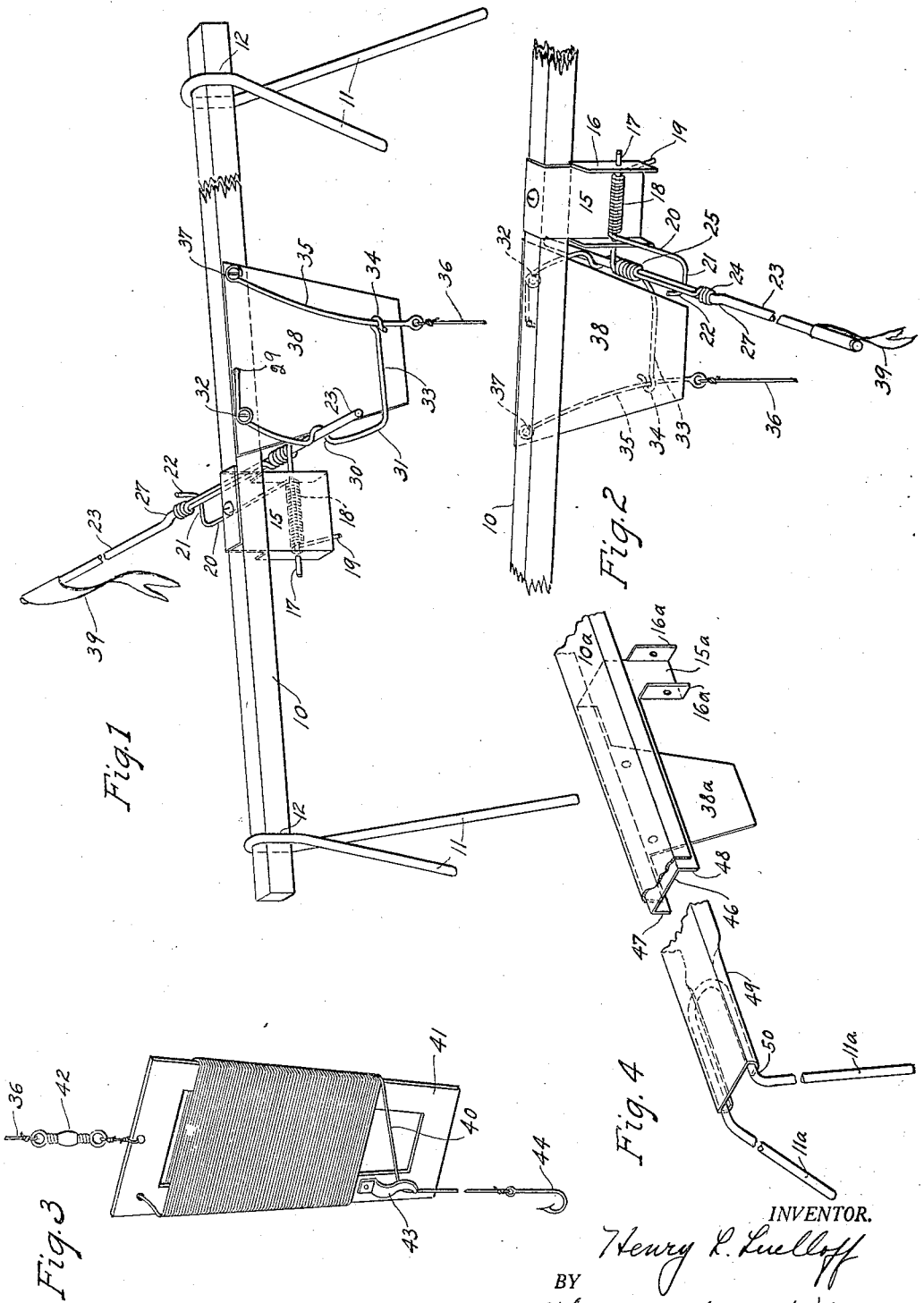

Patented Aug. 18, 1931

1,819,034

UNITED STATES PATENT OFFICE

HENRY L. LUELLOFF, OF MILWAUKEE, WISCONSIN

FISHING APPARATUS

Application filed April 1, 1929. Serial No. 351,476.

My invention relates to improvements in fishing apparatus with particular reference to apparatus of that type in which the lines are connected with suitable supports and the exertions of the fish depended upon to set a signal after the fish has been caught by the hook.

The object of this invention is to provide simple, inexpensive and conveniently operated means for normally supporting the hook at a predetermined distance below the surface of the water, in connection with suitable trip mechanism and signal setting means so arranged that a material pull upon the line will release the trip and allow the signal to be set.

A further object of my invention is to provide apparatus composed of parts which may be easily and quickly separated and placed in the pocket of the user or in any small receptacle, for transportation, and quickly reassembled in position for use.

In the drawings—

Figure 1 is a perspective view of my improved apparatus, with the cord which normally supports the reel, or winding frame, broken away.

Figure 2 is a fragmentary view as seen from the opposite side from that shown in Figure 1.

Figure 3 is a view of the winding frame, line and hook, and a portion of the suspending cord, and Figure 4 is a fragmentary perspective view showing a modification.

Like parts are identified by the same reference characters throughout the several views.

A supporting bar 10, preferably rectangular in cross section, is provided with a pair of legs 11 at each end, those of each pair being preferably formed of a single piece of wire, folded upon itself at approximately its central point and bent to form a pair of parallel clamping rods 12, adapted to embrace the sides of the supporting bar 10. The end portions of the wire are then crossed to form the divergent legs 11. This construction allows the bar 10 to be withdrawn from between the parallel rods 12 when the device is to be stored or transported.

A sheet metal bracket 15 is suspended from the bar 10 and provided with parallel wings 16, suitably apertured to receive a supporting pin 17 upon which a coiled spring 18 is wound. One end 19 of the coil 18 is extended and engaged with the bracket 15 and the other end 20 is of greater length and provided with an elbowed portion 21 having an extremity 22 which hooks about a flag pole 23 between wire coils 24 and 25 thereon. The wire which forms these coils preferably has a straight end extended to form the pin 17 upon which the coil 18 is wound. This wire reenforces the flag pole and the coil 24 abuts a shoulder 27 in the pole to prevent the pole from sliding longitudinally through the coils. The spring 18 tends to swing the arm 20 upwardly, carrying with it the flag pole.

The flag pole is normally held in a horizontal position by engagement of its free end in a loop or V-shaped bend 30 formed in a piece of resilient trip wire 31 which is secured to the bar 10 at 32 and provided with a horizontal extension 33 having an eye 34 through which a hanger wire 35 extends to support the cord 36.

The hanger wire 35 is secured to the bar 10 at 37 and preferably an intermediate plate 38 is secured to the bar 10 by the screws 32 and 37 to provide lateral support for the trip mechanism. The wire 35 is normally inclined in the direction of the trip notch 30 and it will be obvious that a downward pull upon the cord 36 will tend to retract the trip wire 31 and release the flag pole 23. The pole 23 is provided with a suitable signal or flag 39 at the end which the coiled spring 18 tends to raise and therefore, as soon as the trip releases the pole, it will be swung to a vertical position with the signal flag 39 raised in a position for display. The trip wire or trigger 31 has its upper end coiled about the screw 32 with the extremity anchored to the guard plate or shield 38 at 29.

The fish line 40 (Fig. 3) is preferably wound upon a frame 41 which may also be stamped from sheet metal. The cord 36 is attached to the upper end of this frame and a swivel connection may be provided at 42. A resilient clamping arm 43 may have one end secured to the lower portion of the frame 41 and adapted to engage the line between its free end and the frame 41 under light pressure, whereby the line may readily be pulled away by a fish when the latter is caught upon the hook 44. It will, of course, be understood that the hook 44 will be suspended at the proper distance below the surface of the water and by fastening the cord between the clamping arm 43 and the frame, it will not further unwind until the end carrying the hook is pulled with material force by the fish. The frame 41 is preferably tapered to facilitate the release of the line, the latter being permitted to not only unwind but to slip downwardly from the lower end of the frame after being released from the clamping member 43.

When the apparatus is not in use, the flag pole may be withdrawn from its supporting coils 24 and 25 and the legs 11 removed. The frame 41, with the line, may also be removed from the cord 36, if desired, and the entire apparatus may then be carried in a pocket or packed in a basket.

It will, of course, be understood that the fishing apparatus above described is peculiarly adapted for use in fishing through the ice; holes being chopped in the ice and the apparatus supported by the legs so that the cord and line may extend through the hole. One fisherman may thus attend a series of signal setting apparatus. Considerable importance is attached to the trip mechanism, the specific structure of which is not only adapted to readily release the signal under the pull exerted by the fish but it is also adapted to allow instant resetting of the signal after the fish has been taken from the hook. The trip wire 31 curves downwardly from the notch 30 and in the direction of the supporting wire 35 to which the horizontal portion 33 of the trip wire is connected. Therefore after the flag pole has once been released, it can be instantly reset by merely pushing it downwardly to the horizontal position, for the lower end of the pole will engage and move along the inclined portion of the trip wire 31 until the pole is received in the notch 30. The connection at 32 is sufficiently rigid so that the resilience of the trip wire will allow it to yield while the pole is pressed against it and the wire will spring into retaining position as soon as the pole is in registry with the notch or V-shaped bend 30.

Referring to the modification shown in Figure 4, it will be observed that in place of the bar 10, I employ a channel bar 10a formed of sheet metal with down-turned flanges which are folded inwardly at the ends of the bar to form slideways 49. The legs 11a are formed of wire which instead of being crossed, as shown in Fig. 1, is bent to form a U-shaped loop 50 which may be inserted in the channel ways 49 and removed when the device is to be transported.

In this modified construction, the shield 38a and the bracket 15a with its side flanges 16a may be struck up from a single piece of sheet metal, the body portion 46 of which comprises a channel bar adapted to snugly fit within the channel bar 10a. The side flanges 47 and 48 frictionally engage the side flanges of the bar 10a with sufficient pressure to hold the channel bar 46 therein. In the construction shown, the shield 38a constitutes an extension of the flange 47, whereas the bracket 15a is struck up from an extension of the flange 48. The purpose of the shields 38 and 38a is to prevent the trigger member 31 and the hanger rod 35 from being accidentally struck and bent out of shape.

I claim:

1. Fishing apparatus, including the combination with a support, of a wire hanger connected with the support and adapted to carry the fishing tackle, a resilient trip wire depending from the support and having a horizontally extending arm connected with the hanger wire, said depending portion of the trip wire having a portion provided with a laterally extending U-shaped bend in which a flag pole may be engaged, and a spring operated flag pole connected with said support and having an end portion adapted to be engaged by said trip wire to normally hold it in a non-signalling position against the tension of its spring.

2. The combination with a support, of a signal pole pivoted to the support, a spring tending to urge the signal pole to a vertical position, a resilient trip adapted to engage the pole when in a substantially horizontal position, and a trip releasing arm connected with a fish line, said trip comprising a piece of resilient wire connected with the support and provided with a laterally extending pole receiving bend adapted to release the pole when the lower end of the wire is deflected laterally.

3. The combination with a support, of a signal pole pivoted to the support, a spring tending to urge the signal pole to a vertical position, a resilient trip adapted to engage the pole when in a substantially horizontal position, and a trip releasing arm connected with a fish line, said trip comprising a piece of resilient wire connected with the support and provided with a pole receiving bend and an inclined portion below the bend adapted to yield and allow the pole to be swung to trip engaging position from a vertical position.

4. The combination with a supporting bar, of a trip supporting bracket and a signal supporting bracket, a resilient trip wire supported with a curved portion projecting beyond one margin of the trip supporting bracket in the direction of the signal supporting bracket and provided with a V- shaped bend in which the pole may be engaged when in a nearly horizontal position, a hanger wire having a fish line connected thereto and being also loosely connected with the lower portion of the trip wire, and a spring actuated signal having an arm adapted to be engaged by the trip when in a non-signalling position.

5. The combination with a supporting bar, of a trip supporting bracket and a signal supporting bracket, a resilient trip wire supported with a curved portion projecting beyond one margin of the trip supporting bracket in the direction of the signal supporting bracket and provided with a V-shaped bend in which the pole may be engaged when in a nearly horizontal position, a hanger wire having a fish line connected thereto and being also loosely connected with the lower portion of the trip wire, and a spring actuated signal having an arm adapted to be engaged by the trip when in a non-signalling position, said bar having pairs of legs at each end formed to resiliently clamp or release the bar to allow the parts to be separately stored.

6. In a fishing apparatus of the described class, the combination of a supporting bar provided with signal setting and tripping mechanism, said bar being rectangular in cross section and having at each end a pair of detachable legs, each pair formed of a single piece of wire having parallel portions to embrace the sides of the bar and leg portions to support the same.

7. In a fishing apparatus, a supporting channel-shaped bar having side flanges inturned to form slideways, and end legs having horizontally extending members engageable in said slideways.

8. In a fishing apparatus, the combination of a channel-shaped supporting bar with side flanges inturned at its end to form a slideway, and a set of legs formed of wire having an intermediate portion bent to form a horizontally extending loop engageable in said slideway.

9. In a fishing apparatus, the combination of a channel-shaped supporting bar with side flanges inturned at its end to form a slideway, and a set of legs formed of wire having an intermediate portion bent to form a horizontally extending loop engageable in said slideway, and a shorter channel-shaped bar engaged telescopically within the first mentioned bar and provided with signal supporting and trip supporting brackets.

HENRY L. LUELLOFF.